(12) United States Patent
Hecky et al.

(10) Patent No.: US 9,114,961 B2
(45) Date of Patent: Aug. 25, 2015

(54) METHOD FOR RELATIVE POSITIONING OF LAND VEHICLES IN RELATION TO A CRANE

(75) Inventors: Stéphane Hecky, Eloie (FR); Pascal Balon, Dung (FR)

(73) Assignee: Envision Vehicle Engineering Novasio Technology Event, Hericourt (FR)

( * ) Notice: Subject to any disclaimer, the term of this patent is extended or adjusted under 35 U.S.C. 154(b) by 58 days.

(21) Appl. No.: 13/497,321

(22) PCT Filed: Sep. 8, 2010

(86) PCT No.: PCT/FR2010/051865
§ 371 (c)(1),
(2), (4) Date: Mar. 28, 2012

(87) PCT Pub. No.: WO2011/033210
PCT Pub. Date: Mar. 24, 2011

(65) Prior Publication Data
US 2012/0179370 A1    Jul. 12, 2012

(30) Foreign Application Priority Data

Sep. 21, 2009   (FR) ..................................... 09 56476

(51) Int. Cl.
*G21C 21/14* (2006.01)
*B66C 13/46* (2006.01)
*G06Q 10/08* (2012.01)
*B65G 63/04* (2006.01)

(52) U.S. Cl.
CPC ................ *B66C 13/46* (2013.01); *G06Q 10/08* (2013.01); *B65G 63/045* (2013.01)

(58) Field of Classification Search
CPC .... G01C 21/00; G01C 21/3407; G01C 21/28; G01S 5/0027; G01S 5/0072
USPC .......................................... 701/468, 470, 472
See application file for complete search history.

(56) References Cited

U.S. PATENT DOCUMENTS

| | | | | |
|---|---|---|---|---|
| 5,381,338 A | * | 1/1995 | Wysocki et al. | 701/409 |
| 5,504,482 A | * | 4/1996 | Schreder | 340/995.13 |
| 2002/0161675 A1 | | 10/2002 | Kawase | |
| 2004/0125985 A1 | | 7/2004 | Heidenback et al. | |
| 2005/0158158 A1 | * | 7/2005 | Porta | 414/392 |
| 2005/0192702 A1 | | 9/2005 | Moutsokapas | |
| 2005/0281644 A1 | | 12/2005 | Lussen et al. | |
| 2006/0251498 A1 | * | 11/2006 | Buzzoni et al. | 414/139.9 |
| 2008/0252417 A1 | * | 10/2008 | Thomas et al. | 340/10.1 |
| 2008/0304443 A1 | | 12/2008 | Twitchell, Jr. | |
| 2009/0322510 A1 | * | 12/2009 | Berger et al. | 340/539.1 |

FOREIGN PATENT DOCUMENTS

| | | |
|---|---|---|
| DE | 4005538 A1 | 8/1991 |
| EP | 0748080 A1 | 12/1996 |
| EP | 1182154 A1 | 2/2002 |

(Continued)

*Primary Examiner* — Behrang Badii
*Assistant Examiner* — Daniel L Greene
(74) *Attorney, Agent, or Firm* — Laurence A. Greenberg; Werner H. Stemer; Ralph E. Locher

(57) ABSTRACT

A method for relative positioning of land vehicles under a crane in order to load and unload a load, such as a container, onto and from the vehicles, includes guiding a first vehicle relative to the crane and guiding other vehicles relative to the first vehicle that is already positioned or is still being guided under the crane, so that the second vehicle following the first vehicle is correctly placed behind it.

6 Claims, 1 Drawing Sheet

(56) References Cited

FOREIGN PATENT DOCUMENTS

| | | |
|---|---|---|
| JP | 4147303 A | 5/1992 |
| WO | 03078292 A1 | 9/2003 |
| WO | 2004041707 A1 | 5/2004 |

* cited by examiner

METHOD FOR RELATIVE POSITIONING OF LAND VEHICLES IN RELATION TO A CRANE

BACKGROUND OF THE INVENTION

Field of the Invention

The present invention relates to the context of load handling, in particular the loading and unloading of containers.

It will be noted that such a container has a rectangular parallelepipedal form, the dimensions of which have been standardized internationally, namely eight feet wide for a length of twenty, thirty or forty feet.

The invention is preferentially, but not exclusively, applicable to the handling of containers in a port infrastructure, for transshipment from a maritime craft, such as a container ship, to a land vehicle, and vice versa. This transshipment is generally performed using cranes equipped with what is commonly called a "spreader".

In this context, the loading and unloading of containers involve a period of immobilization of the vehicles concerned that has to be reduced to the absolute maximum to improve cost effectiveness and the related costs.

It is for this reason that the spreaders have been modified to switch from single handling, displacing a single container with each movement between the vehicles, to multiple handling, enabling a number of containers to be displaced, in the form of one or more rows, in a single movement.

However, although the recovery or deposition of rows of containers on a container ship is easy, the same does not apply when it comes to the land vehicles. In practice, a number of land vehicles then have to be positioned accurately, under the crane, so that the operator can deposit thereon or recover therefrom the containers with a minimum of handling operations, notably by intervening as little as possible on the spacing of the spreaders.

For this, there are systems for positioning land vehicles, in particular their chassis, in relation to the crane. A simple and widely-used solution consists in a marking on the ground, delimiting the placements of the vehicles in relation to the crane. The drivers simply have to park their vehicles in the specified places. In addition, three-color traffic light systems are installed, for indicating to the driver when to stop. This solution is, however, still precarious and is not entirely satisfactory. Furthermore, while the placement in the forward, namely longitudinal, direction may be relatively accurate, the lateral positioning of the vehicle remains imprecise.

This is why consideration has been given to directly coordinating the placement of the vehicles in relation to the crane. One solution consists in manual guidance of the driver by the crane operator through onboard display means in the vehicle, in the passenger compartment. The effectiveness of such a system however depends on the instructions given to the driver and does not allow, or allows only with difficulty, a number of vehicles to be positioned simultaneously.

To overcome this drawback, still with a view to optimization, automatic systems have been put in place so as to transmit instructions to a number of vehicles simultaneously so that they are positioned correctly under the crane. Such automatic systems use a global referencing system centered in relation to the crane which transmits its instructions to each vehicle according to the detected position of the vehicle concerned. This detection can be performed by numerous means, such as laser or infrared beams with targets or beacons mounted on the vehicles or else transmitter/receiver pairs positioned on the vehicle and the crane.

Other systems, such as global satellite positioning (GPS), have been considered, but they do not provide satisfactory accuracy and are therefore used for a first rough positioning, before using an abovementioned automatic system.

The positioning methods and devices of the prior art present a major drawback because of the global referencing system centered in relation to the crane. Furthermore, such systems notably have to wait for the positioning of the lead vehicle or vehicles to be done to allow for the positioning of the other vehicles.

The documents WO 032/078292, DE 40.05.538 and EP 1.182.154 illustrate this state of the knowledge of those skilled in the art in the field.

BRIEF SUMMARY OF THE INVENTION

The aim of the present invention is to overcome the drawbacks of the prior art by proposing a novel solution for relative positioning of the vehicles in relation to the crane, in particular a relative positioning of the vehicles in relation to one another.

For this, the subject of the present invention is a method for relative positioning of land vehicles in relation to a crane for loading and unloading a load respectively onto and from said vehicles.

In such a positioning method, a first vehicle is positioned under said crane, characterized in that at least one second vehicle detects the position of the first vehicle in order to position itself in relation thereto.

According to another characteristic, the positioning of the vehicles is performed in real time.

Advantageously, the positioning of said second vehicle being performed while the first vehicle is moving.

Furthermore, the positioning of the first vehicle under the crane is performed in relation to a global coordinate system centered under the crane or through guidance information transmitted from said crane.

Preferentially, this method consists in calculating the differentials of coordinates, according to at least two axes, of the positions between the first and the second vehicles, then, according to said differentials, transmitting guidance indications to said second vehicle.

According to one embodiment, a degree of tolerance is applied to said differentials.

The invention thus ensures an accurate positioning of the vehicles relative to one another, in real time, and which can be performed simultaneously.

Other features and advantages of the invention will emerge from the following detailed description of nonlimiting embodiments of the invention, with reference to the appended figures in which:

DESCRIPTION OF THE INVENTION

Figure 1:
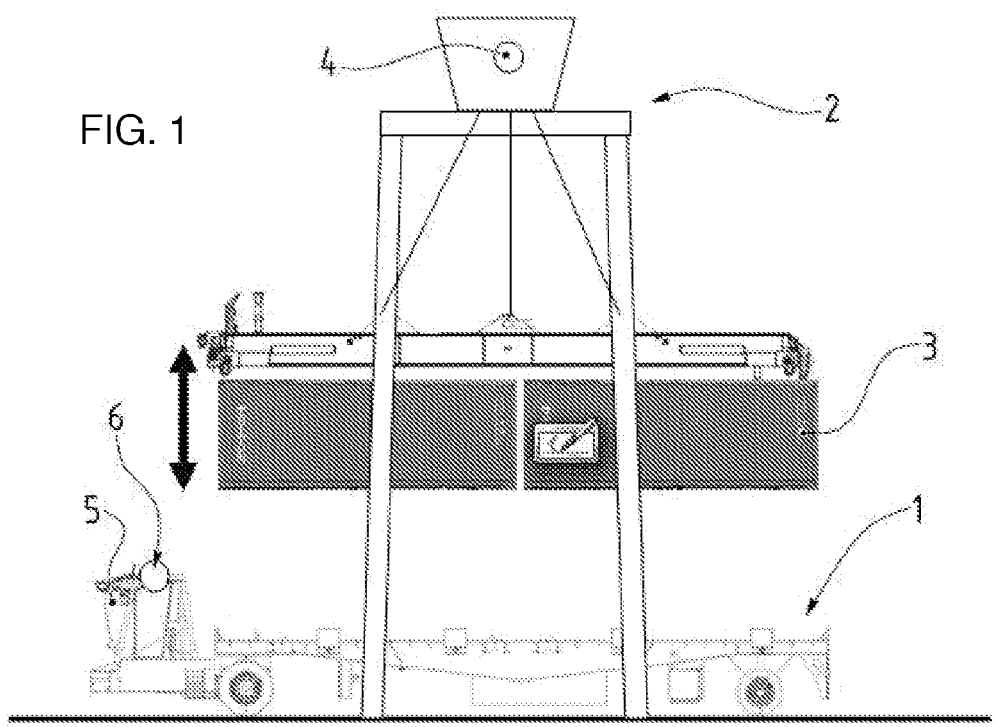
FIG. 1 schematically represents a side view of a crane in the process of loading/unloading containers on a vehicle.
Figure 2:
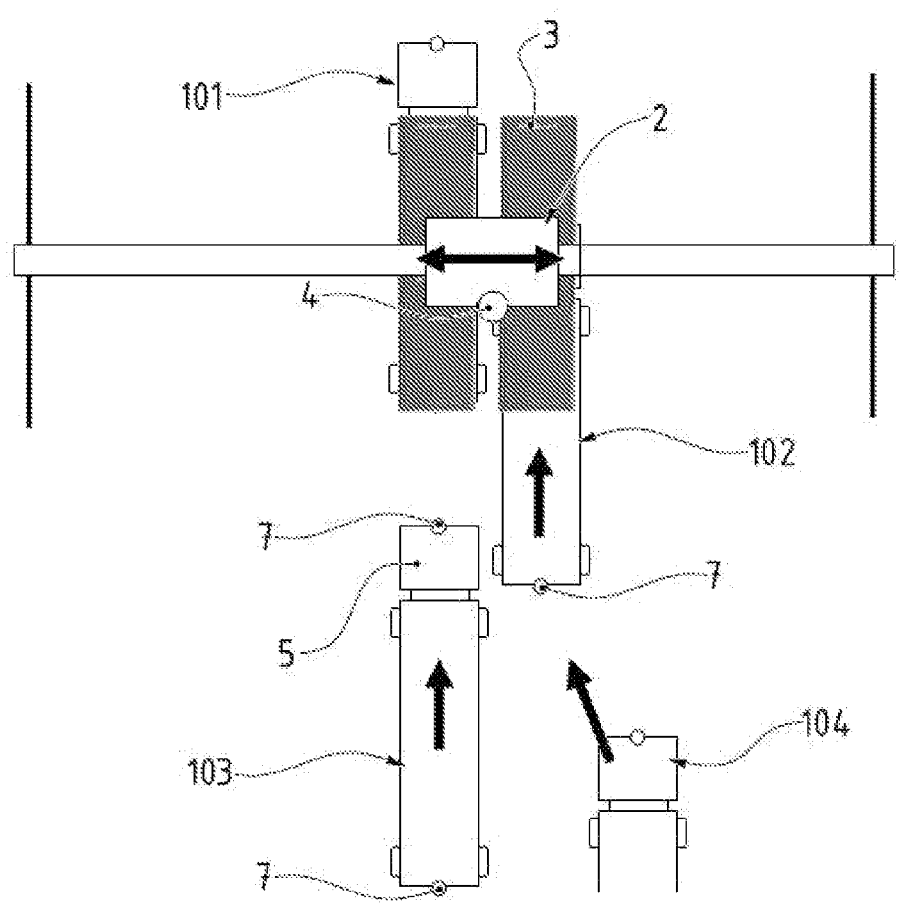
FIG. 2 schematically represents a plan view of the same crane in the process of loading/unloading containers on a number of vehicles being positioned in relation to one another by means of the method according to the invention.

The present invention relates to the positioning of land vehicles 1 in relation to a crane 2 for loading and unloading a load, notably at least one container 3, respectively onto and from said vehicles 1.

Advantageously, the positioning according to the invention is relative, in other words it envisages positioning, in relation to said crane 2, a second vehicle 102 in relation to a first vehicle 101 already positioned or in the process of positioning. In the latter case, the positioning of a number of vehicles 101, 102, 103, 104 is then performed simultaneously.

For this, the subject of the invention is a method for relative positioning of land vehicles 101, 102, 103, 104 in relation to said crane 2, in particular at least two vehicles 101 and 102.

First of all, such a method allows a first vehicle 101 to be positioned under said crane 2 in a standard manner, namely in relation to a global reference system centered on the crane 2.

This initial positioning of the first vehicle 101 can be performed in different ways, in particular by transmitting positioning data from the crane 2.

Thus, the positioning of the first vehicle 101 under the crane 2 is performed in relation to a global coordinate system centered under the crane 2 or directly through guidance information transmitted from said crane 2. This guidance information may be communicated by an operator or else automatically.

Moreover, these data can be transmitted automatically by the crane 2 and the positioning system envisaged. In practice, the crane 2 may then include means 4 for detecting at least one vehicle 101 within a delimited area. Upon detecting a vehicle, if there is no other vehicle already present in said area, the system determines that it is the first vehicle 101 and sends it the directives for its placement.

Advantageously, after this initial positioning, a second vehicle 102 detects the position of the first vehicle 101 in order to position itself in relation thereto.

Generally, the system according to the invention provides for any vehicle to be able to detect the presence of another vehicle and identify it.

To this end, it will be noted that the first vehicle 101 may receive a specific identification so that the other vehicles 102, 103, 104 identify it as such and position themselves in relation thereto.

Furthermore, a number of vehicles 102, 103, 104 may then position themselves in relation to said first vehicle 101, but also in relation to one another, through the assignment of an identifier determining their positioning. The identifier may then be a code corresponding to the order on a placement grid or else to the positioning coordinates.

According to a preferential embodiment, the relative aspect of the positioning according to the invention consists in calculating the differentials of coordinates of the positions between the first 101 and the second 102 vehicles, then, according to said differentials, transmitting guidance indications to said second vehicle 102.

These differentials may be calculated according to at least two axes of coordinates, notably on the ground according to a two-dimensional Cartesian coordinate system, with an X axis and a Y axis. This coordinate system may be centered on the crane 2 or on the first vehicle 101.

Said differentials make it possible to automatically guide the placement of the second vehicle 102 or else communicate guidance or driving instructions to the driver of the vehicle.

It will be noted that a minimum threshold may be applied to said differentials, so as to position the vehicles with a minimum distance between them.

Furthermore, a degree of tolerance may be applied to said differentials. In other words, the positioning provides for a limit distance, of the order of one or more centimeters, to consider the positioning of a vehicle to be correct. This degree may be calculated according to the tolerance of the spreader for the loading and unloading.

Moreover, the relative positioning method according to the invention enables the vehicles 101, 102, 103, 104 to be placed in real time. For this, each detection of the vehicles between them and from the crane 2 to the first vehicle 101 is performed with a high refresh frequency.

This particular feature makes it possible to position the second vehicle 102 while the first vehicle 101 is moving. Thus, the invention provides for a time saving in the positioning, since it is no longer necessary to wait for the placement of one vehicle in order to position another.

According to the preferential embodiment, the communication of the guidance data to the driver can be performed through display means, preferentially installed in the driver's cab 5 of each vehicle 1.

Furthermore, each vehicle 1 can be independent, with a detection and guidance system installed. Moreover, non-exhaustively, any type of detector, in the form of transmitter and receiver, can be envisaged.

According to a particular embodiment, at least one transmitter 6 is positioned on each vehicle 1, enabling it to be located and identified. Such a transmitter 6 may be positioned in the top part of the vehicle 1, for example on the roof of the driver's cab 5.

Furthermore, a receiver can be mounted on the crane 2 so as to collect the position and identification information from all the surrounding vehicles, particularly present in said area described previously. Such a receiver may be incorporated in the detection means 4.

Advantageously, said crane 2 may include a computer which compiles the data relating to the coordinates of the different vehicles present under the crane 2, i.e. within the area. Such a computer can also be used to send guidance data to the first vehicle 101 for its positioning.

The crane 2 may also have a transmitter, distinct or not, for sending these compiled data to all the vehicles 101, 102, 103, 104.

Then, a receiver can be installed in each vehicle to receive said compiled data. A vehicle can then meet the position of all the other vehicles through the compiled data transmitted by the crane 2.

It will be noted that the detection, the transmission and the reception of the data on each vehicle can be performed by numerous means 7, such as laser or infrared beams with targets or beacons mounted on the vehicles, at the front and/or at the rear, or else transmitter/receiver pairs positioned on the vehicle and the crane.

Furthermore, each vehicle may include a system for calculating the differentials, on the basis of the compiled data received or else directly by detection of the other vehicles. As stated previously, this calculation system generates guidance instructions which are communicated to the driver, notably through display means inside the driver's cab.

This calculation system may also be able to be set up by the driver of the vehicle, depending on the case in point. In particular, when loading a container 3, each vehicle can have a different destination area and they should therefore be positioned so as to optimize their paths and maneuvers.

As an example, a configurable operating mode may consist in choosing the row, or its longitudinal displacement axis, as an X axis. The driver then simply has to align the vehicle and advance to the exact Y axis position.

It will be noted that the data exchanged and transmitted may take any form, notably a matrix of coordinates with which to locate the vehicles accompanied by the identifier thereof.

The relative positioning according to the invention is particularly applicable in guiding tractors and port self-propelled vehicles, in a semi-automatic mode, namely a drive executed by drivers but guided by the instructions transmitted via the method according to the invention.

Furthermore, the invention may complement a GPS positioning system in a fully automated port terminal. In practice, the invention will be able to use the terminal's global positioning system, or else the world satellite positioning system, to perform a rough positioning of vehicles under the crane 2 concerned then the positioning according to the invention takes over, notably upon the detection of one or more vehicles within a specified and delimited area surrounding said crane 2.

The invention makes it possible to position a number of vehicles simultaneously, in relation to the crane 2 and in relation to the other vehicles. It therefore offers great flexibility of use for different types of loading and unloading, both multiple and single. In practice, in the case of the loading or unloading of a single container 3, the invention makes it possible to accurately guide an align a number of vehicles, optimizing the maneuvering time.

Finally, the invention can be entirely incorporated within the vehicles, the crane 2 no longer being used as a global coordinate system. Each vehicle can then move independently in relation to the crane and orient itself in relation to the other vehicles already present.

The invention claimed is:

1. A method for automatic relative positioning of land vehicles in relation to a crane for loading a load onto and unloading a load from the vehicles, the method comprising the following steps:
    automatically positioning a first vehicle under the crane in relation to a global reference system centered on the crane by automatically transmitting data from the crane to the first vehicle;
    detecting a position of the first vehicle in a specified and delimited area surrounding the crane by using a second vehicle having a detection and guidance system carrying out the detecting step while both the first vehicle and the second vehicle are simultaneously located in the specified and delimited area surrounding the crane;
    automatically positioning the second vehicle in the specified and delimited area surrounding the crane in relation to the position of the first vehicle while the first vehicle is in the specified and delimited area surrounding the crane, using the detection and guidance system, by:
        calculating differentials of coordinates of the positions between the first vehicle and the second vehicle using a calculating system in the second vehicle; and
        transmitting guidance indication to the second vehicle according to the differentials.

2. The relative positioning method according to claim 1, which further comprises carrying out the positioning of the vehicles in real time.

3. The relative positioning method according to claim 1, which further comprises carrying out the positioning of the second vehicle while the first vehicle is moving.

4. The relative positioning method according to claim 1, which further comprises transmitting guidance information transmitted from the crane to the first vehicle.

5. The relative positioning method according to claim 1, which further comprises applying a degree of tolerance to the differentials.

6. A method for automatic relative positioning of land vehicles in relation to a crane for loading a load onto and unloading a load from the vehicles, in a system wherein a first vehicle is automatically positioned under the crane in relation to a global reference system centered on the crane using data automatically transmitted to the first vehicle from the crane, the method comprising the steps of:
    detecting, with a detection and guidance system of the second vehicle, a position of the first vehicle while both the first vehicle and the second vehicle are simultaneously located within a same specified and delimited area surrounding the crane;
    automatically positioning the second vehicle in the specified and delimited area surrounding the crane in relation to the position of the first vehicle while the first vehicle is in the specified and delimited area surrounding the crane based on the detected position of the first vehicle, using the detection and guidance system of the second vehicle, by:
        calculating differentials of coordinates of the positions between the first vehicle and the second vehicle using a calculating system in the second vehicle; and
        generating and providing guidance instructions for positioning the second vehicle relative to the first vehicle according to the differentials; and
    wherein, in the automatic positioning step, the second vehicle is automatically positioned in the specified and delimited area relative to the first vehicle while the first vehicle is moving.

* * * * *